Nov. 14, 1933.                G. BELLUZZO              1,935,539
PROPELLING DEVICE FOR TORPEDOES WITH MULTIPLE TURBINE ENGINES
Filed Aug. 25, 1931
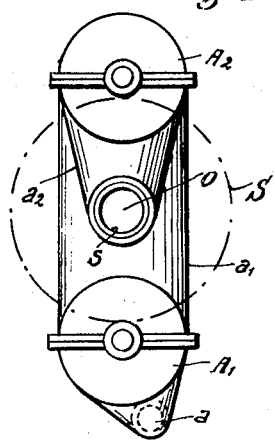
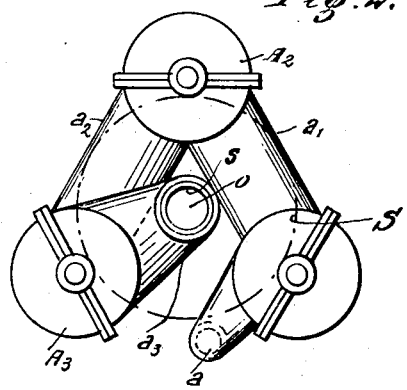
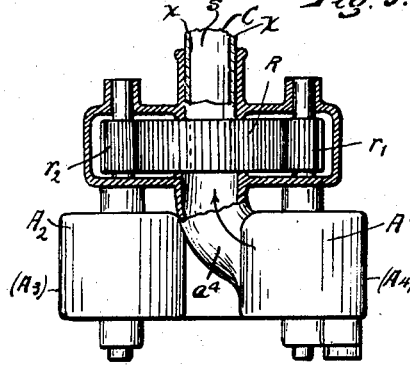
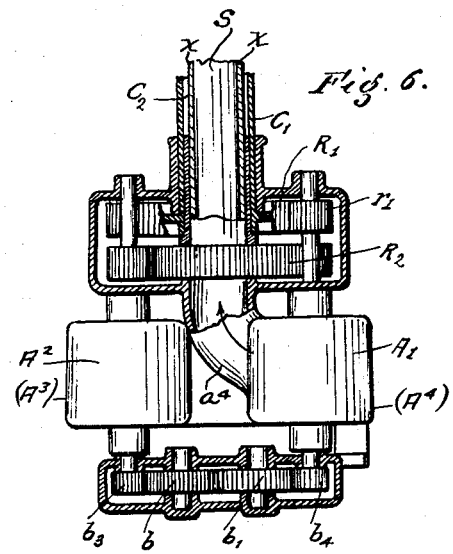
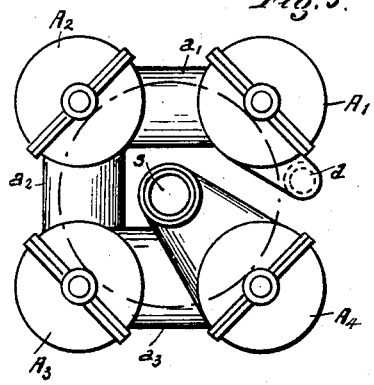
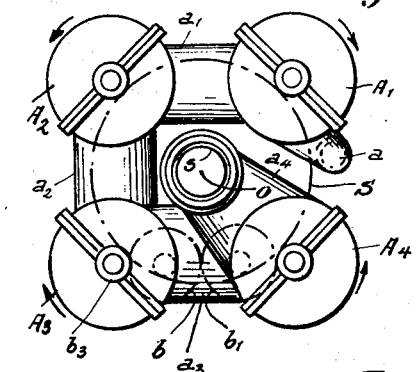

Patented Nov. 14, 1933

1,935,539

UNITED STATES PATENT OFFICE 1,935,539

PROPELLING DEVICE FOR TORPEDOES WITH MULTIPLE TURBINE ENGINES

Giuseppe Belluzzo, Rome, Italy, assignor to Silurificio Whitehead Di Fiume-Societa Anonima, Fiume, Italy Application August 25, 1931, Serial No. 559,332, and in Italy September 2, 1931

3 Claims. (Cl. 60—70)

The propelling of torpedoes is effected at present by means of piston motors acted upon by compressed air arising from a suitable tank heated by combustion of petroleum. In order to ensure the dynamical equilibrium of this kind of propelling systems complicated and very sensible devices had to be provided for, but without reaching the entire desirable and required reliability of operation and with considerably low efficiency. In fact, piston engines are not enabled to yield sufficiently high efficiency while the presence of reciprocating masses gives rise to trouble of equilibrium of the system which unfavourably affect the trajectory of the torpedo.

It has already been proposed to employ pairs of turbines arranged symmetrically with respect to a plane which passes through the axis of the torpedo, which act in parallel. This arrangement presents two inconveniences, which the invention proposes to eliminate. First of all, the symmetrical arrangement with respect to a plane by no means assures either static or dynamic equilibrium of the gyroscopic effects of the system with respect to the median axis of the torpedo, around which turns its propelling shaft; this equilibrium can be obtained only by an arrangement in a symmetrical star formation, according to which the axes of the turbines are equidistant from the axis and form between them angles which are exactly equal; of 180° if two turbines are employed, of 120° if there are three turbines, of 90° for four turbines, and so on. Furthermore, if the turbines operate independently of each other, each of them must absorb all the pressure of the compressed gas contained in the tank. This pressure must then of necessity be kept too low, diminishing the efficiency that can be obtained, and increasing the size of the tank. This inconvenience can only be eliminated by making the turbines operate in series, so that each of them must absorb only a part of the pressure available. The pressure of the gas can then be increased, while decreasing the size of the tank and increasing the distance the torpedo can travel.

It has already been proposed to make two turbines operate in series, turning in planes parallel to the axis of propulsion, but this arrangement permits the employment of only two turbines, which is not yet sufficient, and in any case the propulsion must be effected through the intermediary of conical pinions acting on toothed rims mounted on the periphery of two bells united respectively with the hollow shafts having the same geometric axis and carrying respectively the propeller helixes. This arrangement, which notably improves the static and dynamic equilibrium of the system, presents however the serious inconvenience, that the transmission is accomplished by means of conical gears, which are expensive, delicate and awkward.

The said inconveniences can be eliminated according to the invention by employing several turbines activated in series by the compressed gas causing the propulsion and by constituting and disposing them, so that each one furnishes the same power as the others, and all are arranged in symmetrical star formation around the propelling shaft, so that the aggregate is statically balanced around the axis of the said shaft, and their propulsive efforts, as well as their reactions on the general structure, are balanced mutually with respect to the said axis.

The annexed drawing shows, by way of example only, four different embodiments of the invention which are distinguished each from another both with regard to the number of turbines used and the arrangement of their driving connections.

In the drawing:—

Fig. 1 is a diagrammatic front view of a propelling mechanism comprising two turbines.

Fig. 2 shows in a like manner an arrangement with three turbines.

Figs. 3 and 4 represent similar mechanisms with four turbines which differ each from another with regard to the mutual driving connections and the propelling members.

Figs. 5 and 6 show partly sectional side views of the devices shown in Figs. 3 and 4.

In all embodiments shown, the turbines $A_1$, $A_2$, $A_3$, $A_4$ . . . are arranged in regular star distributed relation about the central axis O of the torpedo S. The driving fluid enters the first turbine $A_1$ through the supply conduit $a$ from a suitable source of fluid under pressure, or reservoir preferably contained in the torpedo, and after working therein it passes successively into the remaining turbines $A_2$—$A_3$—$A_4$ . . . through pipes $a_1$—$a_2$—$a_3$—$a_4$ and is finally discharged into water passing through the hollow center shaft which acts as an exhaust conduit $s$.

In the embodiment shown in Figs. 3–5 the four turbines control four pinions which are also arranged in a symmetrical star relation with regard to the central axis, only two pinions $r_1$—$r_2$ being shown in the drawing and all these pinions gear with a common spur wheel R keyed upon the center shaft C of the torpedo and which transmits its rotary motion to the propelling members. Said wheel S totalizes the driving couples of the various turbines and acts as a reciprocating equalizing device for the different speeds of rotation.

Normally there will be provided as many driving pinions on the wheel R as the number of turbines provides, say two in the case of Fig. 1, three in the case of Fig. 2, and so on.

The described arrangement is not applicable to the case of torpedoes having two propelling members rotating in opposite direction, without employment of conical gears to rotate a countershaft bearing the second propeller and this arrangement would tend to trouble the equilibrium of the arrangement. The plurality of turbines permits, however, to provide also in this case a perfectly equilibrated mechanism as shown in Figs. 4-6.

The turbines $A_1$—$A_3$ rotate in the same direction and act through their pinions upon the spur wheel $R_1$ keyed upon the hollow shaft $C_1$, while the turbines $A_2$—$A_4$ rotate in a direction opposite to that of $A_1$—$A_3$ and act through their pinions upon the toothed wheel $R_2$ keyed upon the hollow shaft $C_2$ which is concentric and internal to the shaft $C_1$. Therefore the shafts $C_1$—$C_2$ rotate in opposite directions and drive the propellers in corresponding opposite directions.

In order that each turbine of one group of turbines may be caused to rotate in an opposite direction and at predetermined speed ratio to the individual turbines of the other group, a mechanical connection between the two groups is provided. This connection may conveniently take the form of a train of gears $b$—$b'$ interposed between pinions $b_3$—$b_4$ secured to shafts rotating with the turbines $A_3$—$A_4$ of the two groups. This arrangement is clearly disclosed in Figures 4 and 6 wherein the intermediate meshing gears $b$—$b'$ are connected through pinions $b_3$—$b_4$ to turbines $A_3$—$A_4$ which turbines are in different groups.

If only two turbines are employed, the one would drive the wheel $R_1$ and the other the wheel $R_2$ and both would be connected together through a train of gears ($b_3$—$b$—$b'$—$b_4$). With three turbines one would act upon one of the wheels $R_1$—$R_2$ and the other two upon the other one, one thereof being connected with the first one through the pre-cited train of gears.

It will be obvious that all particulars of structure and arrangement of the parts may be varied according to the different requirements without departing from the spirit of the invention.

What I claim is:—

1. In a compressed fluid driven torpedo having two concentric hollow axial propeller shafts and a gear fixed on each of said shafts, the combination of at least two groups of turbines secured to shafts mounted to turn on axes parallel to and equally spaced from the axis of said torpedo and being equally spaced apart circumferentially on a circle concentric to the axis of said concentric propeller-shafts, a pinion fixed on each said turbine shaft, said pinions of one of said groups of turbines being disposed in mesh with the gear fixed on one of said axial propeller shafts, said pinions of another of said groups being disposed in mesh with the gear fixed on another axial propeller shaft, and fluid conduits arranged to convey compressed fluid to one of said turbines of one group and from said turbine to a turbine of another group, and in series alternately from group to group to each said turbine and from the last turbine to the interior of the innermost of said concentric hollow propeller shafts to be exhausted therethrough.

2. In a compressed fluid driven torpedo having at least two concentric hollow axial propeller shafts and a gear fixed on each of said shafts, the combination of at least two groups of turbines, each group comprising at least two turbines, all of said turbines being secured to shafts mounted to turn on axes parallel to and equally spaced from the axis of said torpedo and being equally spaced apart circumferentially on a circle concentric to the axis of said concentric propeller-shafts, the turbines of different groups being disposed to rotate in opposite directions, a pinion fixed on each said turbine shaft, said pinions of one of said groups of turbines being disposed in mesh with the gear fixed on one of said axial propeller shafts, said pinions of another of said groups being disposed in mesh with the gear fixed on another axial propeller shaft, whereby said concentric propeller shafts are rotated in opposite directions by said oppositely rotating groups of turbines, and fluid conduits arranged to convey compressed fluid to one of said turbines of one group and from said turbine to a turbine of another group, and in series alternately from group to group to each turbine and from said last turbine to the interior of the innermost of said concentric hollow propeller shafts to be exhausted therefrom.

3. A device of the class described in claim 2 in which an adjacent turbine of each different group is provided with an additional pinion, said additional pinion meshing with one of a pair of intermediate meshing gears to effect a predetermined ratio of rotation in opposite direction of the turbines in said two groups of turbines.

GIUSEPPE BELLUZZO.